(12) United States Patent
Bryan et al.

(10) Patent No.: US 11,390,168 B1
(45) Date of Patent: Jul. 19, 2022

(54) CONTROL SYSTEM FOR A POWER OUTLET ON A HYBRID OR ELECTRIC VEHICLE

(71) Applicant: FORD GLOBAL TECHNOLOGIES, LLC, Dearborn, MI (US)

(72) Inventors: Seth Anthony Bryan, Royal Oak, MI (US); William David Treharne, Ypsilanti, MI (US); Sassan Farahmand, Canton, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/176,699

(22) Filed: Feb. 16, 2021

(51) Int. Cl.
| | | |
|---|---|---|
| *B60L 1/00* | (2006.01) | |
| *B60L 3/12* | (2006.01) | |
| *B60L 7/14* | (2006.01) | |
| *B60R 16/033* | (2006.01) | |

(52) U.S. Cl.
CPC .............. *B60L 1/006* (2013.01); *B60L 3/12* (2013.01); *B60L 7/14* (2013.01); *B60R 16/033* (2013.01); *B60L 2210/40* (2013.01)

(58) Field of Classification Search
None
See application file for complete search history.

(56) References Cited

U.S. PATENT DOCUMENTS

| | | | |
|---|---|---|---|
| 2013/0249495 A1* | 9/2013 | Ang | H02J 7/04 320/134 |
| 2015/0084411 A1* | 3/2015 | Cho | B60L 58/14 307/10.1 |
| 2019/0126737 A1* | 5/2019 | Lo | B60K 6/52 |
| 2020/0055473 A1 | 2/2020 | Ferrel et al. | |
| 2020/0317057 A1 | 10/2020 | Salter et al. | |

\* cited by examiner

*Primary Examiner* — Jared Fureman
*Assistant Examiner* — Aqeel H Bukhari
(74) *Attorney, Agent, or Firm* — David B Kelley; Brooks Kushman P.C.

(57) ABSTRACT

A vehicle includes an engine, an electric machine, a battery, accessory devices, an electrical outlet, an inverter, and a controller. The engine and the electric machine are each configured to propel the vehicle. The inverter is configured to deliver power from the battery or the electric machine to the accessory devices or the electrical outlet. The controller is programmed to adjust the power being delivered by the inverter to the electrical outlet based on a discharge power capacity of the battery, a power output capacity of the engine, a power output capacity of the electric machine, and the power being drawn from the inverter via the accessories.

19 Claims, 2 Drawing Sheets

CONTROL SYSTEM FOR A POWER OUTLET ON A HYBRID OR ELECTRIC VEHICLE

TECHNICAL FIELD

The present disclosure relates to vehicles having electrical outlets that provide power to one or more external devices when the external devices are plugged into the outlets.

BACKGROUND

Electrical outlets are configured to provide power to an external device when the external device is plugged into the outlet.

SUMMARY

A vehicle includes an engine, an electric machine, a battery, at least one accessory, an electrical outlet, an inverter, and a controller. The engine and the electric machine are each configured to propel the vehicle. The inverter is configured to deliver power from the battery or the electric machine to the at least one accessory or the electrical outlet. The controller is programmed to adjust the power being delivered by the inverter to the electrical outlet based on a discharge power capacity of the battery, a power output capacity of the engine, a power output capacity of the electric machine, and the power being drawn from the inverter via the at least one accessory.

A vehicle includes a powertrain and a controller. The controller is programmed to adjust power delivered to an electrical outlet of the vehicle based on a power output capacity of the powertrain.

A vehicle includes a battery, an electric machine, an engine, an electrical circuit, at least one accessory, an electrical outlet, and a controller. The electric machine is configured to receive power from the battery to propel the vehicle and to deliver power to the battery to recharge the battery. The engine is configured to propel the vehicle and to deliver power the electric machine. The electrical circuit is configured to transfer power between the battery and the electric machine. The at least one accessory is configured to draw power from the electrical circuit. The electrical outlet is configured to deliver power from the electrical circuit to an external device that is connected to the outlet. The controller is programmed to, generate a power limit of the electrical outlet based on a discharge power capacity of the battery, a power output capacity of the engine, a power output capacity of the electric machine, and the power being drawn from the electrical circuit via the at least one accessory. The controller is further programmed to, in response to a demanded power at the electrical outlet being less than the power limit, deliver power to the electrical outlet at a value that is equal to the demanded power. The controller is further programmed to, in response to the demanded power at the electrical outlet being greater than the power limit, deliver power to the electrical outlet at a value that is equal to the power limit.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
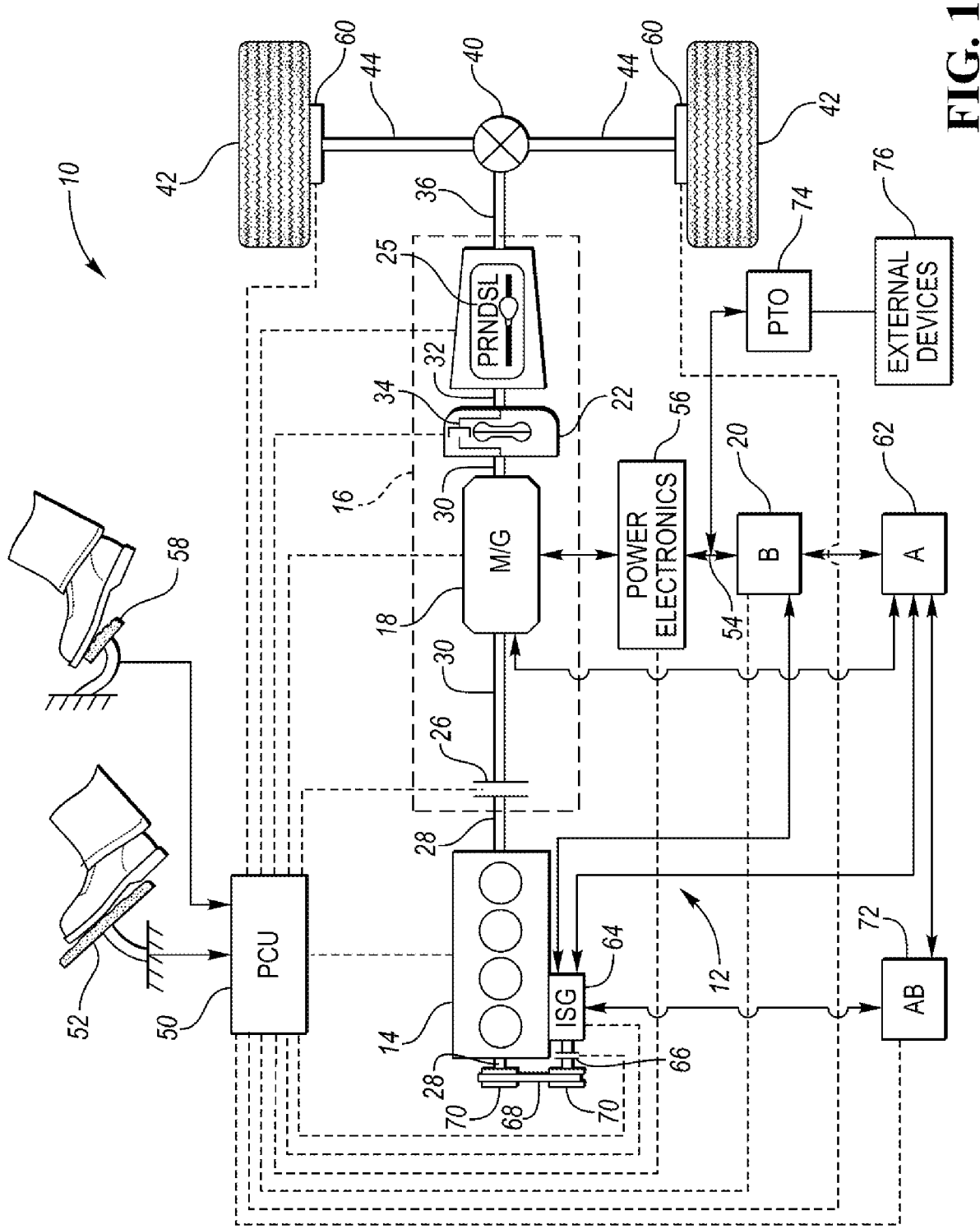
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The transmission, or gearbox 24, may be placed in PRNDSL (park, reverse, neutral, drive, sport, low) via a transmission range or gear selector 25.

The engine 14 and the M/G 18 are both drive sources for the HEV 10 that are configured to propel the REV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VS S), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. To drive the vehicle with the M/G 18 the traction battery 20 transmits stored electrical energy through wiring 54 to the power electronics 56 that may include inverter and rectifier circuitry, for example. The inverter circuitry of the power electronics 56 may convert DC voltage from the battery 20 into AC voltage to be used by the M/G 18. The rectifier circuitry of the power electronics 56 may convert AC voltage from the M/G 18 into DC voltage to be stored with the battery 20. The controller 50 commands the power electronics 56 to convert voltage from the battery 20 to an AC voltage provided to the M/G 18 to provide positive or negative torque to shaft 30. Inverter circuitry and rectifier circuitry are disclosed in U.S. patent application Ser. No. 16/189,713, filed on Nov. 13, 2018, which is incorporated by reference herein in its entirety.

Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and/or the M/G 18 may also be configured to provide electrical power to one or more vehicle accessories 62. The vehicle accessories 62 may include, but are not limited to, climate control systems (including heating and cooling systems for the cabin interior of the vehicle or heating and cooling system for vehicle components, such as a chiller to cool the battery 20), power steering systems, radios, control interfaces (e.g., a human machine interface or user interface), various controllers, entertainment systems (e.g., monitors, DVD players, etc.), electric heaters, or any other system or device that is electrically operated. Some of the accessories 62 may directly draw electrical power from the battery 20, an accessory battery 72, and/or the M/G 18, while some of the accessories 62 may draw electrical power from the battery 20, the accessory battery 72, and/or the M/G 18 via an inverting circuitry, rectifying circuitry, or a DC to DC converter. For example, a DC to DC converter may be disposed between battery 20 and/or accessory battery 72 and one or more of the accessories 62. The vehicle accessories 62 may include high and low voltage accessories that draw power from high and low voltage buses, respectively. The high voltage accessories may include an electric heater for a heating system, an electric compressor for an air conditioning or chilling system, a DC to DC converter, etc. Low voltage accessories may include a human machine interface or user interface, entertainment systems, vehicle lights, radios, etc. Loads from the low voltage accessories may be reflected as a load on a DC to DC converter from the high voltage bus.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge the accessory battery 72, the traction battery 20, or provide electrical energy to power the vehicle accessories 62 when operating as a generator. The accessory battery 72 may also be configured to power the vehicle accessories 62.

Since the traction battery 20 is configured to propel the vehicle 10, the traction battery 20 will operate at a higher relative voltage than the accessory battery 72. Therefore, the traction battery 20 may be referred to a high voltage battery while the accessory battery 72 may be referred to as a low voltage battery.

The vehicle 10 may include a power takeoff 74 that is configured to transfer electrical power from the battery 20 and/or the M/G 18 to one or more external devices 76 that are connected to the power takeoff 74. More specifically, the power the takeoff 74 may be configured to transfer power from the battery 20 and/or the M/G 18 via the wiring 54 to the one or more external devices 76 that are connected to the power takeoff 74. The power takeoff 74 may comprise one or more electrical outlets that deliver power to the external devices 76 that are connected to the electrical outlets. The power takeoff 74 may also include inverting circuitry that converts the DC voltage of the wiring 54 to AC voltage which is then delivered to the one or more electrical outlets. The power electronics 56 and the wiring 54 may collectively be referred to as an electoral circuit. The external devices 76 may be any type of device that is configured to receive electrical power, such as power tools (e.g., saws or drills), lighting devices, air compressors, refrigeration systems, stoves, microwaves, cement mixers, etc. The system may be referred to as a "power to the box" feature or "onboard generator" that transfers electrical power from the battery 20 and/or M/G 18 to any external device.

Additionally, the M/G 18 may be configured to provide electrical power to the power takeoff 74 and any external device 76 that is connected to the power takeoff 74. The M/G 18 may also be connected to the power takeoff 74 through the power electronics 56. The controller 50 may be configured to control the amount of electric current that is being delivered from the M/G 18 and/or the battery 20 to the power takeoff 74.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should further be understood that the vehicle configuration described herein is merely exemplary and is not intended to be limited. Other electric or hybrid vehicle configurations should be construed as disclosed herein. Other electric or hybrid vehicle configurations may include, but are not limited to series hybrid vehicles, parallel hybrid vehicles, series-parallel hybrid vehicles, plug-in hybrid electric vehicles (PHEVs), fuel cell hybrid vehicles, battery electric vehicles (BEVs) or any other electric or hybrid vehicle configuration known to a person of ordinary skill in the art.

Given that the amount of power available from the high voltage bus is limited, the proposed design presents a method for assessing available power and establishing a limit for the onboard generator (i.e., power takeoff 74). The scheme also establishes a priority for the electrical loads from the accessory devices on the powertrain and establishes a residual load value for operating the on board generator.

Figure 2:
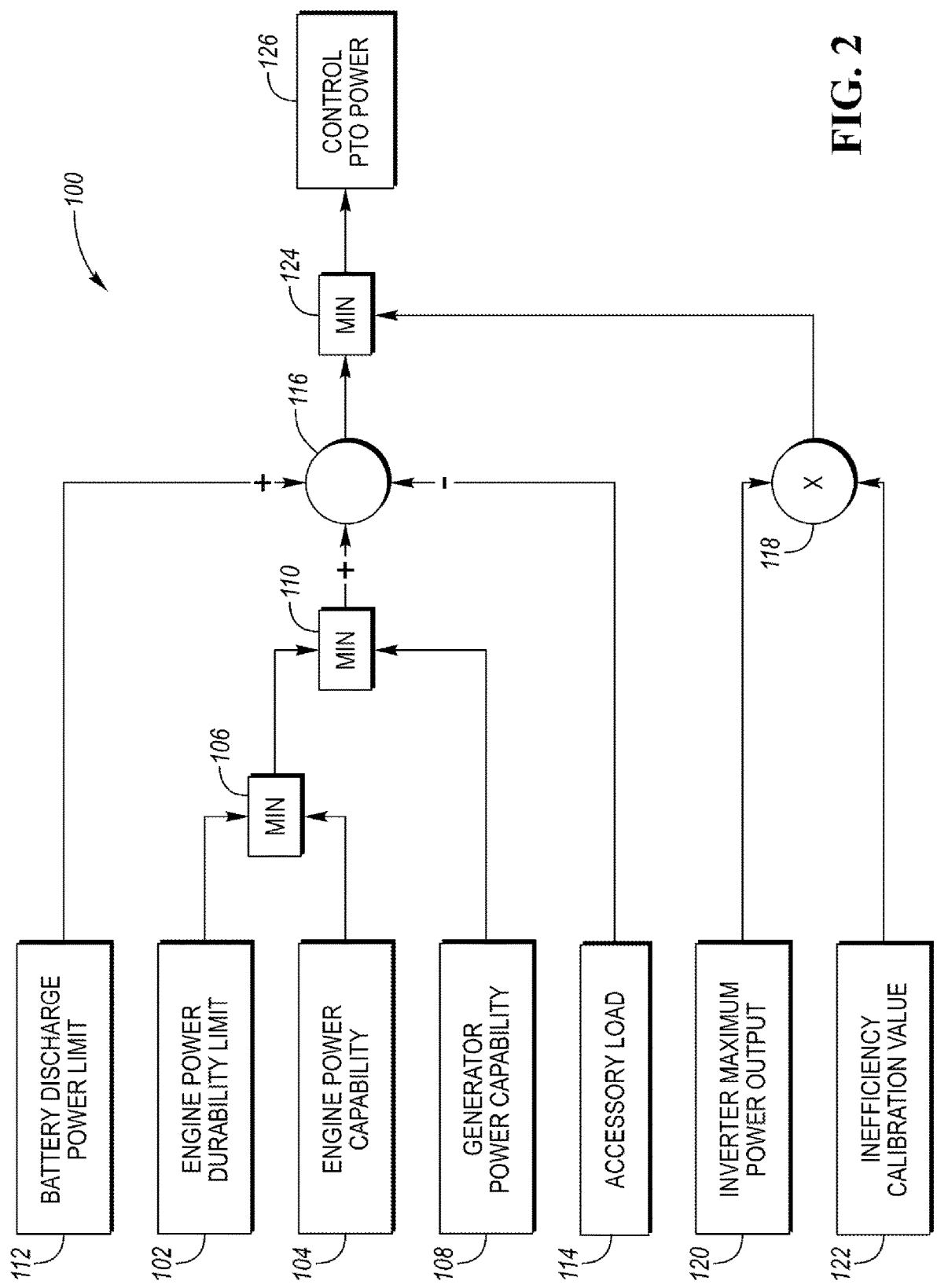
FIG. 2 is a flowchart of a method for controlling the power output for an electrical outlet on the vehicle.

Referring to FIG. 2, a method 100 for controlling the power output for an electrical outlet (e.g., a power outlet of the power takeoff 74) on the vehicle 10 is illustrated. The method 100 may be stored as control logic and/or an algorithm within the controller 50. The controller 50 may implement the method 100 by controlling the various components of the vehicle 10. The method 100 may be initiated by turning a start key or ignition of the vehicle 10 to an "on" position.

The method 100 determines a minimum of a power durability limit of the engine 102 (e.g., engine 14) and power capability or capacity of the engine 104 (e.g., engine 14) at block 106. The power durability limit of the engine 102 refers to a maximum torque output or an upper torque output limit of the engine 14 at a given speed of the engine 14. The engine power capability or capacity 104 refers to a maximum power output or power output limit of the engine 14. The method 100 then determines a minimum of the output of block 106 and a generator power capability or capacity 108 of the M/G 18 at block 110. The generator power capability or capacity 108 of the M/G 18 refers to a maximum power output or an upper power output limit of the M/G 18 to produce electrical power while operating as a generator. Please note that alternative embodiments may include vehicles that have one or more electric machines where at least one of the electric machines may operate solely as a generator.

Next, the method 100 determines a summation of the output of block 110 and a discharge power limit of the traction battery 112. The discharge power limit of the traction battery 112 refers to a maximum power output, an upper power output limit, a power output capability, or a power output capacity that of the traction battery 20 to produce electrical power. A difference between the summation of the outputs of blocks 110 and 112 and the accessory load 114 is then determined at summation/subtraction block 116. The accessory load 114 may refer to the total electrical load that is being consumed by the vehicle accessories 62.

At block 118, the method 100 determines a product of a maximum power output of the inverting circuitry of the power takeoff 120 and an inefficiency calibration value or coefficient 122. The maximum power output of the inverting circuitry of the power takeoff 120 is a maximum power output, an upper power output limit, a power output capability, or a power output capacity of the inverting circuitry of the power takeoff 74. The inefficiency calibration value or coefficient 122 may be a constant value that correlates to inefficiency losses of the inverting circuitry of the power takeoff 74. Next, at block 124 the method 100 determines a minimum of the output of block 116 and the output block 118.

The output of block 124 is then utilized as a power limit of the power takeoff 74 at block 126 for controlling the electrical power being delivered to the one or more electrical outlets of the power takeoff 74. More specifically, at block 126, the electrical power being delivered to the one or more electrical outlets of the power takeoff 74 is limited such that it does not exceed the power value determined at block 124. For example, if a demanded power at the one or more electrical outlets of the power takeoff 74 is less than the power value determined at block 124, then the demanded power will be delivered to the one or more electrical outlets of the power takeoff 74. On the other hand, if the demanded power at the one or more electrical outlets of the power takeoff 74 is greater than the power value determined at block 124, then the power delivered to the one or more electrical outlets of the power takeoff 74 will be limited to the power value determined at block 124 and will be less than the demanded power. Alternatively, at block 126 if the demanded power at the one or more electrical outlets of the power takeoff 74 is greater than the power value determined at block 124, the power to the one or more electrical outlets of the power takeoff 74 may be shut off. Changes to or shutting down the power to the one or more electrical outlets of the power takeoff 74 may be communicated to a vehicle operator via a human machine interface.

In the event that a total demanded power load of the vehicle accessories 62 and the power takeoff 74 is greater than power capabilities or capacity of the electrical system of the vehicle 10 to produce and deliver the total demanded power load, the controller 50 may prioritize delivering power to specific systems or subcomponents of the vehicle 10. For example, the highest priority may be delegated to controllers (e.g., controller 50) and control interfaces (e.g., a human machine interface or user interface), the second highest priority may be delegated to climate control systems (including heating and cooling systems for the cabin interior of the vehicle or heating and cooling system for vehicle components, such as a chiller to cool the battery 20), the third highest priority may be the power takeoff 74, and the lowest priority may be delegated to generating wheel torque to propel the vehicle. Such a reduction in wheel torque will typically be intermittent short durations for most users and the magnitude of the reduction will be relatively small in contrast to maximum power capability of powertrain.

According to the priority scheme described in the paragraph above and with respect to the power takeoff 74, or more specifically with respect to the one or more outlets of the power takeoff 74, the controller may be programmed to: (i) reduce a power to propel the vehicle to less than a power demand to propel the vehicle in response to a sum of the power demand to propel the vehicle and a power demand of the electrical outlets of the power takeoff 74 exceeding a threshold that corresponds to the power capabilities, capacity, or limit of the electrical system of the vehicle 10; (ii) reduce the power to the electrical outlets of the power takeoff 74 to less than a power demand of the electrical outlets of the power takeoff 74 in response to a sum of a power demand of a control or user interface and the power demand of the electrical outlets exceeding a threshold that corresponds to the power capabilities, capacity, or limit of the electrical system of the vehicle 10; (iii) reduce the power to the electrical outlets of the power takeoff 74 to less than a power demand of the electrical outlets of the power takeoff 74 in response to a sum of a power demand of a climate control system and the power demand of the electrical outlets exceeding a threshold that corresponds to the power capabilities, capacity, or limit of the electrical system of the vehicle 10; and (iv) reduce the power to the electrical outlets of the power takeoff 74 to less than a power demand of the electrical outlets the power takeoff 74 in response to a sum of a power demand of the controller 50 and the power demand of the electrical outlet exceeding a threshold that corresponds to the power capabilities, capacity, or limit of the electrical system of the vehicle 10.

It should be understood that the flowchart in FIG. 2 is for illustrative purposes only and that the method 100 should not be construed as limited to the flowchart in FIG. 2. Some of the steps of the method 100 may be rearranged while others may be omitted entirely. It should be further understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    an engine and an electric machine each configured to propel the vehicle;
    a battery;
    at least one accessory;
    an electrical outlet;
    an inverter configured to deliver power from the battery or the electric machine to the at least one accessory or the electrical outlet; and
    a controller programmed to,
        adjust the power being delivered by the inverter to the electrical outlet based on a discharge power capacity of the battery, a power output capacity of the engine, a power output capacity of the electric machine, and the power being drawn from the inverter via the at least one accessory,
        limit the power being delivered by the inverter to the electrical outlet to a threshold value that is based on a minimum of (i) the power output capacity of the engine and (ii) the power output capacity of the electric machine,
        in response to a demanded power at the electrical outlet being less than the threshold value, deliver power to the electrical outlet at a value that is equal to the demanded power, and
        in response to the demanded power at the electrical outlet being greater than the threshold value, deliver power to the electrical outlet at a value that is equal to the threshold value.

2. The vehicle of claim 1, wherein the threshold value is further based on a summation of the minimum and the discharge power capacity of the battery.

3. The vehicle of claim 2, wherein the threshold value is further based on a difference between the summation and the power being drawn from the at least one accessory.

4. The vehicle of claim 3, wherein the threshold value is further based on the power output capacity of the inverter.

5. The vehicle of claim 4, wherein the threshold value is further based a minimum of (i) the difference and (ii) the power output capacity of the inverter.

6. A vehicle comprising:
    a powertrain; and
    a controller programmed to,
        adjust power delivered to an electrical outlet of the vehicle based on a power output capacity of the powertrain,
        limit the power being delivered to the electrical outlet to a threshold value,
        in response to a demanded power at the electrical outlet being less than the threshold value, deliver power to the electrical outlet at a value that is equal to the demanded power, and
        in response to the demanded power at the electrical outlet being greater than the threshold value, deliver power to the electrical outlet at a value that is equal to the threshold value.

7. The vehicle of claim 6, wherein the powertrain further comprises an engine, an electric machine, and a battery, and wherein the power output capacity of the powertrain includes a discharge power capacity of the battery, a power output capacity of the engine, and a power output capacity of the electric machine.

8. The vehicle of claim 7, wherein the threshold value is based on a summation of (i) a minimum of the power output capacity of the engine and the power output capacity of the electric machine and (ii) the discharge power capacity of the battery.

9. A vehicle comprising:
    a battery;
    an electric machine configured to receive power from the battery to propel the vehicle and to deliver power to the battery to recharge the battery;
    an engine configured to propel the vehicle and to deliver power the electric machine;
    an electrical circuit configured to transfer power between the battery and the electric machine;
    at least one accessory configured to draw power from the battery;
    an electrical outlet configured to deliver power from the electrical circuit to an external device that is connected to the outlet; and
    a controller programmed to,
        generate a power limit of the electrical outlet based on a discharge power capacity of the battery, a power output capacity of the engine, a power output capacity of the electric machine, and the power being drawn from the electrical circuit via the at least one accessory,
        in response to a demanded power at the electrical outlet being less than the power limit, deliver power to the electrical outlet at a value that is equal to the demanded power, and
        in response to the demanded power at the electrical outlet being greater than the power limit, deliver power to the electrical outlet at a value that is equal to the power limit.

10. The vehicle of claim 9, wherein the power limit is based on a minimum of (i) the power output capacity of the engine and (ii) the power output capacity of the electric machine.

11. The vehicle of claim 10, wherein the power limit is based on a summation of the minimum and the discharge power capacity of the battery.

12. The vehicle of claim 11, wherein the power limit is based on a difference between the summation and the power being drawn from the at least one accessory.

13. The vehicle of claim 12, wherein the power limit is further based on power output capacity of the electrical circuit.

14. The vehicle of claim 13, wherein the power limit is based a minimum of (i) the difference and (ii) the power output capacity of the electrical circuit.

15. The vehicle of claim 13, wherein the power limit is based a minimum of (i) the difference and (ii) a product of power output capacity of the electrical circuit and an efficiency coefficient.

16. The vehicle of claim 9, wherein the controller is further programmed to in response to a sum of a power demand to propel the vehicle and a power demand of the electrical outlet exceeding a threshold, reduce the power to propel the vehicle to less than the power demand to propel the vehicle.

17. The vehicle of claim 9 further comprising a user interface, and wherein the controller is further programmed to in response to a sum of a power demand of the user interface and a power demand of the electrical outlet exceeding a threshold, reduce the power to the electrical outlet to less than the power demand of the electrical outlet.

18. The vehicle of claim 9 further comprising a climate control system, and wherein the controller is further programmed to in response to a sum of a power demand of the climate control system and a power demand of the electrical outlet exceeding a threshold, reduce the power to the electrical outlet to less than the power demand of the electrical outlet.

19. The vehicle of claim 9, wherein the controller is further programmed to in response to a sum of a power demand of the controller and a power demand of the electrical outlet exceeding a threshold, reduce the power to the electrical outlet to less than the power demand of the electrical outlet.

* * * * *